United States Patent
Mil'shtein et al.

(10) Patent No.: US 10,857,883 B2
(45) Date of Patent: Dec. 8, 2020

(54) EFFICIENT CONTROL OF FUEL CONSUMPTION IN CARS

(71) Applicant: The University of Massachusetts, Boston, MA (US)

(72) Inventors: Sam Mil'shtein, Chelmsford, MA (US); Christopher Whitehead, Boston, MA (US); HarshaPurushothama Dombala, Lowell, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 345 days.

(21) Appl. No.: 15/810,652

(22) Filed: Nov. 13, 2017

(65) Prior Publication Data

US 2018/0134157 A1 May 17, 2018

Related U.S. Application Data

(60) Provisional application No. 62/421,546, filed on Nov. 14, 2016.

(51) Int. Cl.
*B60K 31/02* (2006.01)
*B60W 50/08* (2020.01)
(Continued)

(52) U.S. Cl.
CPC .............. *B60K 31/02* (2013.01); *B60K 31/04* (2013.01); *B60W 30/143* (2013.01);
(Continued)

(58) Field of Classification Search
CPC ..... B60K 31/02; B60K 31/04; B60W 30/143; B60W 30/1882; B60W 50/087;
(Continued)

(56) References Cited

U.S. PATENT DOCUMENTS 6,393,350 B1 * 5/2002 Light ................... B60W 10/06
477/62
8,340,884 B1 * 12/2012 He ..................... B60W 30/1882
701/103
(Continued)

FOREIGN PATENT DOCUMENTS

CA 2741263 A1 * 3/2012 ......... F02D 19/0628
EP 0382997 A2 * 8/1990 ............... B60T 1/08
(Continued)

OTHER PUBLICATIONS

Mohamed et al., "An Inertial Sensor for Mechanical Compensation of the Vehicle Vertical Movement Impact on In-Vehicle Embedded Camera Orientation," Year: 2007, Publisher: IEEE.*
(Continued)

*Primary Examiner* — Tuan C To
(74) *Attorney, Agent, or Firm* — Cantor Colburn LLP (57) ABSTRACT

A system that includes an accelerometer configured to measure acceleration of a vehicle, a gyroscope configured to measure orientation of the vehicle, a memory having computer readable instructions, and a processor for executing the computer readable instructions. The computer readable instructions include performing at intervals: receiving acceleration data from the accelerometer; receiving orientation data from the gyroscope; combining the acceleration data and the orientation data to generate speed fluctuation and slope data for the vehicle; and transmitting the fluctuation and slope data to a controller of the vehicle. The controller utilizes the speed fluctuation and slope data to modulate an engine throttle of the vehicle.

17 Claims, 4 Drawing Sheets

(51) Int. Cl.
  B60W 30/188 (2012.01)
  B60K 31/04 (2006.01)
  B60W 30/14 (2006.01)
  B60W 50/00 (2006.01)
(52) U.S. Cl.
  CPC ...... B60W 30/1882 (2013.01); B60W 50/087 (2013.01); B60W 2050/0012 (2013.01); B60W 2420/905 (2013.01); B60W 2552/15 (2020.02); B60W 2552/20 (2020.02); B60W 2710/0605 (2013.01); B60Y 2300/143 (2013.01); B60Y 2300/433 (2013.01); B60Y 2300/52 (2013.01); B60Y 2400/304 (2013.01)
(58) Field of Classification Search
  CPC ... B60W 2050/0012; B60W 2420/905; B60W 2550/142; B60W 2300/143; B60W 2710/0605; B60Y 2300/143; B60Y 2300/433; B60Y 2300/52; B60Y 2400/304
  USPC .......................................................... 701/93
  See application file for complete search history.

(56) References Cited

U.S. PATENT DOCUMENTS

| | | | | |
|---|---|---|---|---|
| 8,437,935 | B2* | 5/2013 | Braunberger | B60W 30/18054 701/70 |
| 8,954,251 | B2* | 2/2015 | Braunberger | G08G 1/16 701/70 |
| 9,081,651 | B2 | 7/2015 | Filev et al. | |
| 9,187,051 | B2* | 11/2015 | Feser | B60R 21/013 |
| 9,580,103 | B2* | 2/2017 | Schramm | B62D 5/005 |
| 2004/0187845 | A1* | 9/2004 | Clemence | F02D 11/105 123/396 |
| 2005/0119798 | A1* | 6/2005 | Lee | G01P 7/00 701/1 |
| 2011/0276216 | A1* | 11/2011 | Vaughan | B60W 10/06 701/31.4 |
| 2012/0173083 | A1* | 7/2012 | Hsu | B60T 8/17554 701/45 |
| 2013/0313033 | A1* | 11/2013 | Elliott | F16H 61/47 180/197 |
| 2014/0309862 | A1* | 10/2014 | Ricci | B60R 25/1004 701/36 |
| 2015/0025731 | A1* | 1/2015 | Uehara | B60W 50/14 701/23 |
| 2016/0034770 | A1* | 2/2016 | Peterson | B60Q 1/10 701/49 |
| 2016/0202078 | A1* | 7/2016 | Scalisi | G06F 16/9537 701/519 |
| 2016/0358477 | A1* | 12/2016 | Ansari | G06Q 30/0251 |
| 2017/0088167 | A1* | 3/2017 | Fujii | B62D 6/002 |
| 2017/0106855 | A1* | 4/2017 | Lavoie | B60W 30/00 |

FOREIGN PATENT DOCUMENTS

| | | | | |
|---|---|---|---|---|
| EP | 0546730 | A2 * | 6/1993 | ............ B60T 8/5037 |
| EP | 2907710 | A1 * | 8/2015 | |

OTHER PUBLICATIONS

Milan et al., "The Practical Design of In-Vehicle Telematics Device with GPS and MEMS Accelerometers," Year: 2011, Publisher: IEEE.*
"2015 Honda Fit: What Does the ECON Button Do?", http://www.autotrader.com/car-reviews/2015-honda-fitwhat-does-the-econ-button-do-245119, 7 pages, 2017.
"How Honda Civic ECO mode increases fuel economy" http://www.torquenews.com/1574/how-honda-civic-ecomode-increases-fuel-economy, 4 pages, 2017.
"LIS2HH12 adapter board for a standard DIL24 socket" www.st.com/resource/en/data_brief/steval-mki164v1.pdf, 4 pages, Sep. 2016.
"MEMS digital output motion sensor: ultra-low-power high-performance 3-axis "pico" accelerometer" www.st.com/resource/en/datasheet/lis2hh12.pdf, 47 pages, Dec. 2015.
"STEVAL-MKI109V2: eMotion motherboard for MEMS adapter boards" www.st.com/resource/en/user_manual/cd00280880.pdf, 41 pages, Oct. 2016.
"Transform Fleet Performance With Video Insight" http://www.smartdrive.net/documents/smartdrive-truckingfuel-study_2011.pdfs[2] www.st.com/resource, 6 pages, 2017.
Whitehead, et al. "Saving Fuel and Increasing Performance the MEMs Way", Intern. IEEE 60th IEEE MWSCAS Apr. 2017, 4 pages.

* cited by examiner

EFFICIENT CONTROL OF FUEL CONSUMPTION IN CARS

CROSS-REFERENCE TO RELATED APPLICATION

This application claims the benefit of U.S. Provisional Application No. 62/421,546, filed Nov. 14, 2016, and entitled "Efficient Control of Fuel Consumption in Cars", the content of which is incorporated herein by reference in its entirety.

BACKGROUND OF THE INVENTION

Embodiments of the present invention relate in general to vehicles and, more specifically, to efficient control of fuel consumption in vehicles.

Hybrid vehicles save a lot fuel, but they are significantly more expensive than their conventional counterparts. Even small size cars today often have inadequate fuel economies. A significant portion of fuel consumption in a vehicle occurs when accelerating during stop-and-go traffic on city streets and when accelerating on highways, particularly when driving up a hill. Many drivers and cruise control systems allow vehicle speed to drop when initially climbing a hill. The driver or cruise control system then over-accelerates to catch back up to the desired speed.

SUMMARY

Embodiments of the present invention include methods, systems, and computer program products for providing efficient control of fuel consumption in vehicles. A non-limiting example system includes an accelerometer configured to measure acceleration of a vehicle, a gyroscope configured to measure orientation of the vehicle, a memory having computer readable instructions, and a processor for executing the computer readable instructions. The computer readable instructions include performing at intervals: receiving acceleration data from the accelerometer; receiving orientation data including road profile data from the gyroscope; combining the acceleration data and the orientation data to generate speed fluctuation and slope data for the vehicle; and transmitting the fluctuation and slope data to a controller of the vehicle that modulates an engine throttle of the vehicle based at least in part on the speed fluctuation and slope data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION OF THE INVENTION

Exemplary embodiments of the present invention are directed to optimizing fuel consumption in a vehicle by modulating engine throttle in response to road grade (angle of inclination), thus eliminating the need to accelerate to catch back up to speed when driving up a hill. Additionally, modulation of throttle in response to road grade may give the perception to the driver that the engine has better torque than it actually has, as the vehicle will not lose speed when traversing hills. This may help push people towards purchasing vehicles with smaller, more fuel-efficient, engines. Using road grade rather than wheel-speed feedback is not only more accurate, but as a feed-forward control, it is inherently stable, which simplifies its implementation into existing engine control and cruise control schemes. Filtering algorithms to reject the influence of road irregularities, such as those used to measure vehicle tilt, allow for even faster detection of changes in road angle.

Consumption of fuel in conventional vehicles with internal combustion engines can be an issue, regardless of seasonal fluctuations of oil prices. It is well known that a significant amount of fuel is used during vehicle acceleration as well as when the speed of a car changes irregularly. One or more embodiments of the present invention described herein include a device which is capable of measuring acceleration very accurately. For example, if a vehicle is at a speed of 55 miles per hour and it goes to 55.0022 miles per hour in 2 seconds time, one or more embodiments of the device will detect the acceleration. In other words, the device can sense an extremely small change of a velocity of a vehicle, in this example 0.0022 miles per hour. One or more embodiments of the present invention include a processor which transfers information about fluctuation of speed (acceleration) to a controller that is controlling the engine throttle of a gasoline or diesel car. In addition, the device can profile the road slope (uphill/downhill) and forecast the best regime of driving to minimize acceleration, resulting in reduced fuel consumption.

In gasoline and diesel vehicles, the largest amount of fuel is consumed when a vehicle accelerates. The most typical events when a car accelerates are well known and include but are not limited to, "stop and go" movement caused by street lights; climbing up a hill, accelerating unintentionally or intentionally to increase speed, and driving with cruise control as the velocity of the car usually fluctuates. One or more embodiments of the present invention described herein improve or optimize fuel consumption by providing data to modulate an engine throttle in response to a road profile (angle of inclination or slope), thus reducing or eliminating the need to increase acceleration to catch back up to speed when driving up a hill. Providing this information (in digital or analog form) allows for improving or optimizing acceleration in instances where a change of speed occurs. It should be appreciated that while embodiments described herein may refer to a passenger vehicle such as a car, this is for exemplary purposes only as the vehicle may any type of vehicle having an internal combustion engine, such as a truck for example.

One or more embodiments of the present invention include a high-sensitivity, three-axis, accelerometer which is used to determine road profiles. Known filtering methods such as a low-pass filter, can be applied to minimize the influence of road irregularities (e.g., road hazards, potholes, etc.), hard accelerations, or similar events on the calculations.

One or more embodiments of the present invention can be used to reduce the carbon monoxide (CO) emission of vehicles. It is estimated that when starting and stopping and waiting for a green light, an average vehicle emits 800 g/mi (grams per mile traveled) of CO. The principal air-quality pollutant emissions from petrol, diesel, and alternative-fuel engines are CO, oxides of nitrogen, un-burnt hydrocarbons and particulate matter. Gasoline engines emit greater levels of nitrogen oxide ($NO_x$) and $CO_x$, respectively, during hard acceleration. Emissions of $NO_x$ are an air quality issue, particularly in urban areas. Contamination created by vehicles can impact pedestrians in the street, particularly the elderly and children, and those with respiratory problems. Embodiments of the present invention described herein provide a low cost solution that can reduce emissions of CO by reducing vehicle accelerations. Reducing vehicle accelerations can also reduce vehicle fuel expenses.

Figure 1:
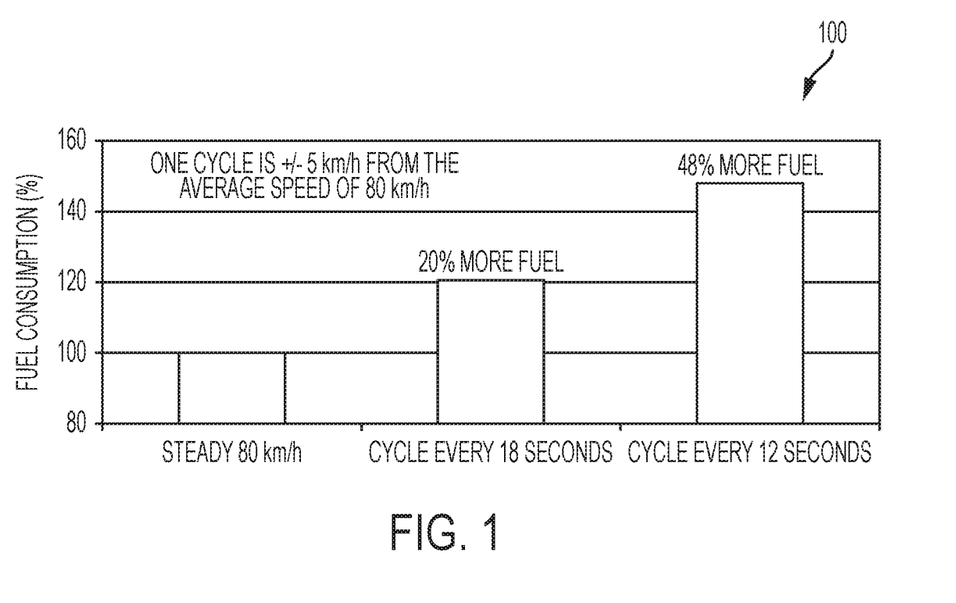
FIG. 1 illustrates a typical level of fuel consumption when a vehicle is operating in a steady-state and when the throttle is cycled.
Figure 2:
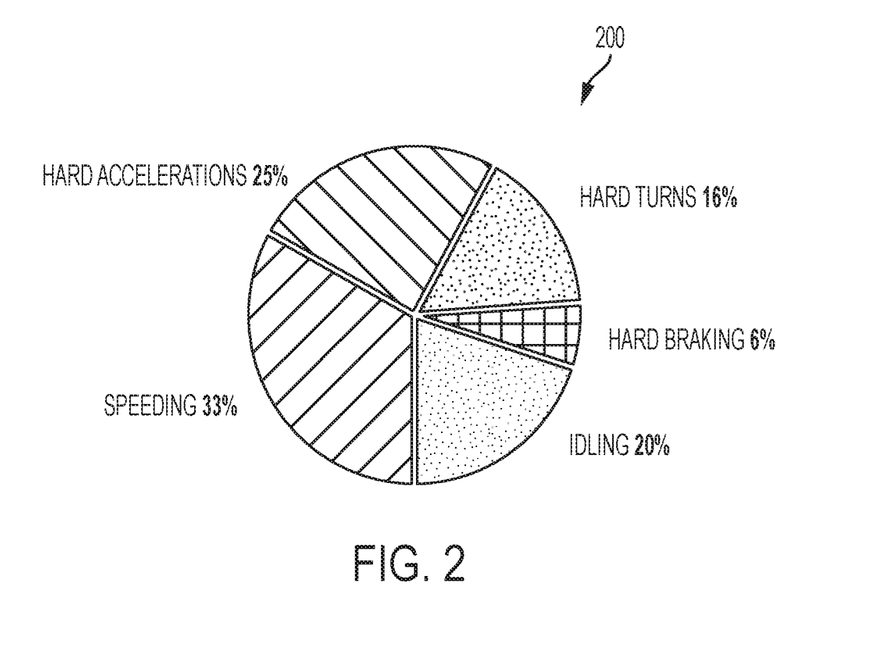
FIG. 2 illustrates fuel consumption associated with different driving actions.

Turning now to FIG. 1, a graph 100 that shows a typical level of fuel consumption of a vehicle is generally shown. The graph 100 shows fuel consumption when the vehicle is operating in a steady-state and when the engine throttle is cycled when climbing and then descending a hill. As shown in FIG. 1, fuel consumption goes up rapidly as the acceleration of the vehicle increases irregularly. Turning now to FIG. 2, a graph 200 that shows a typical fuel consumption associated with different driving actions is generally shown. As shown in FIG. 2, 58% of fuel can be conserved by reducing speed and by proper acceleration.

Contemporary devices similar to cruise control and fuel injection can perform a function which targets the improvement or optimization of gasoline usage. However, contemporary cruise control systems are based on sensing a wheel's revolutions per mile (RPM) and are not addressing the economical usage of gasoline but rather controlling the programmed speed of the vehicle (e.g., a car). Contemporary fuel injection devices also do not work to minimize gasoline usage.

Figure 3:
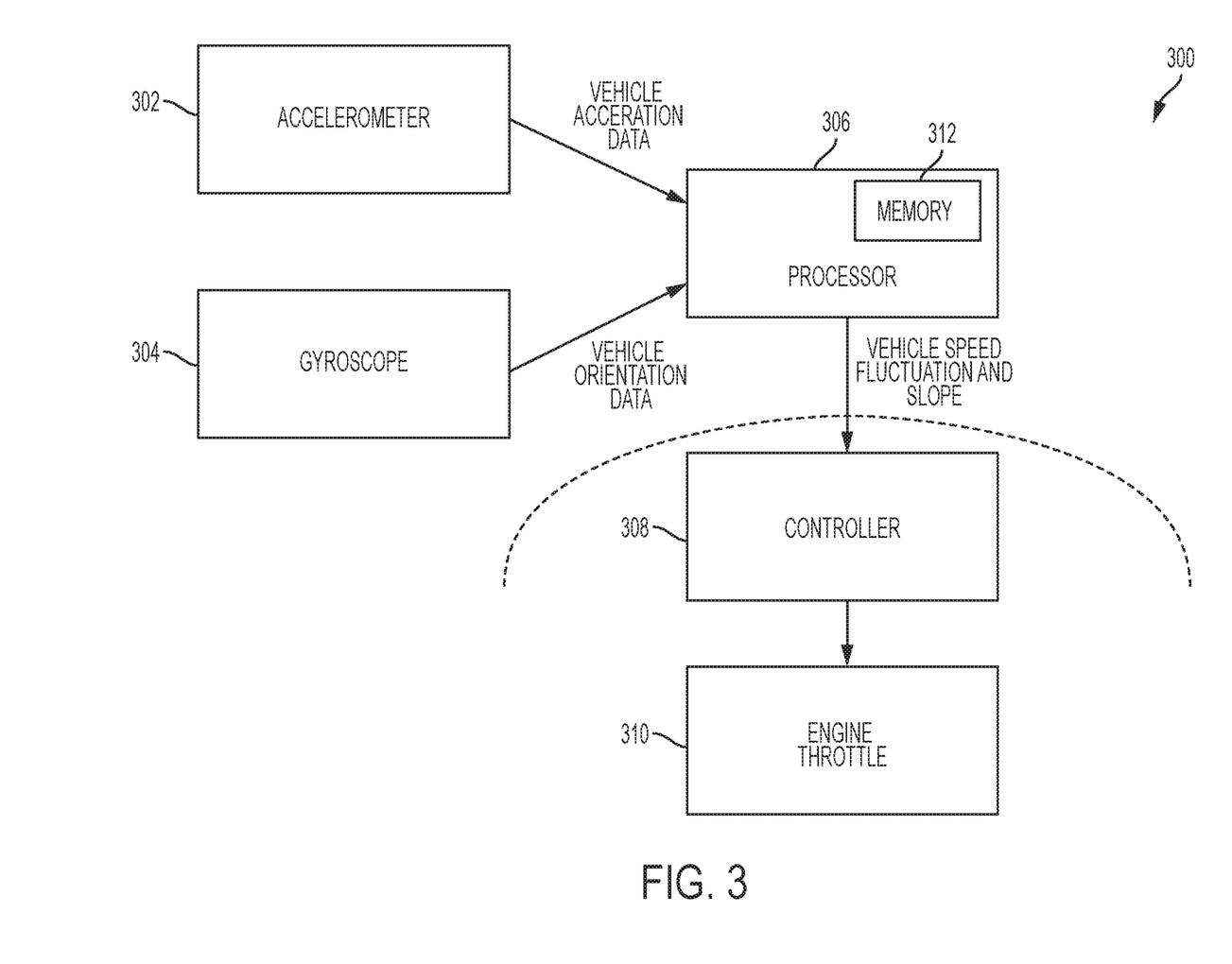
FIG. 3 illustrates a system for providing efficient control of fuel consumption in accordance with one or more embodiments of the present invention.

Turning now to FIG. 3, a system 300, or device, for providing efficient control of fuel consumption is generally shown in accordance with one or more embodiments of the present invention. The system shown in FIG. 3 can be located in vehicle. The system 300 includes an accelerometer 302 configured to measure acceleration of a vehicle, a gyroscope configured to measure orientation of the vehicle, and processor 306 that includes memory 312 for storing computer instructions. In an embodiment, the processor 306 executes the computer instructions to perform the processing described herein. At intervals (e.g., periodic, in response to detecting an event, etc.), vehicle acceleration data from the accelerometer 302 and vehicle orientation data (including road profile data) from the gyroscope are received at the processor 306. In an embodiment, the accelerometer 302 is a tri-axis accelerometer and additional orientation data is received from the accelerometer 302. The acceleration data and the orientation data are combined by the processor 306 to generate speed fluctuation and slope data for the vehicle. The processor 306 transmits the fluctuation and slope data to a controller 308 of the vehicle that modulates an engine throttle 310 of the vehicle based at least in part on the speed fluctuation and slope data from the controller 308. In an embodiment, the fluctuation and slope data are adjusted based on detecting potholes, up hills, down hills, etc. on a roadway being traveled by the vehicle. In an embodiment, the fluctuation and slope data are adjusted based on detecting a fast acceleration of the vehicle. In an embodiment, the controller 308 of the vehicle modulates the engine throttle of the vehicle by reducing a number of times that the throttle cycles within a time period. In an embodiment, the engine throttle 310 is operating in a cruise control mode and the controller 308 utilizes a correction to a feed-forward calculation to modulate the engine throttle of the vehicle.

In accordance with one or more embodiments of the present invention, in order to compensate for changes in vehicle weight distribution that might change the angle of the vehicle relative to the road surface, the accelerometer 302 is placed on the vehicle suspension, so that its angle doesn't change with vehicle loading. In another exemplary embodiment, the accelerometer 302 is placed directly on the engine computer circuit board.

Absolute acceleration is measured in three directions: the direction of travel (x), side-to-side (y), and vertical (z). On a flat road the z-axis will always measure approximately 9.8 m/s2 (the force of gravity). The x-axis will be a measurement of change in road angle. The angle of the road may be calculated in at least two ways. The first method is $\sin^{-1}$ (x-axis). However, this method can be prone to error from changes in vehicle acceleration, and to a lesser extent, error due to potholes and road irregularities. An alternate method is to use $\tan^{-1}$ (x-axis/z-axis). This method is less susceptible to errors due to changes in vehicle acceleration, but is more prone to errors due to potholes or other road irregularities that cause a z-axis acceleration. For both of these methods, potholes and road irregularities are recognized and the x and z-axis data are aggressively filtered when those events are detected. This can be done, for example, by using the accelerometer's freefall interrupt to detect abrupt changes in acceleration, which are indicative of a pothole. A second detection of "bad" data is to sum all three axes. When the only source of acceleration is gravity, all three axis readings will sum to 90 degrees, regardless of the orientation of the accelerometer. If the sum is different than 90 degrees, then additional forces are acting on the accelerometer and the data may not accurately reflect road grade. "Bad" data which isn't caught by the freefall detection, could be caused by things like sharp turns, mild to moderate road irregularities, and moderate changes in vehicle acceleration. If a pothole or "bad" data is detected, then the data can will undergo additional low-pass filtering.

Figure 4:
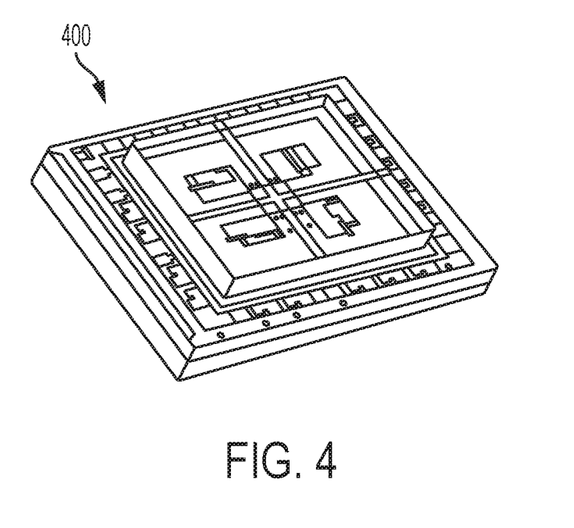
FIG. 4 illustrates a thermal accelerometer with supporting electronics in accordance with one or more embodiments of the present invention.
Figure 5:
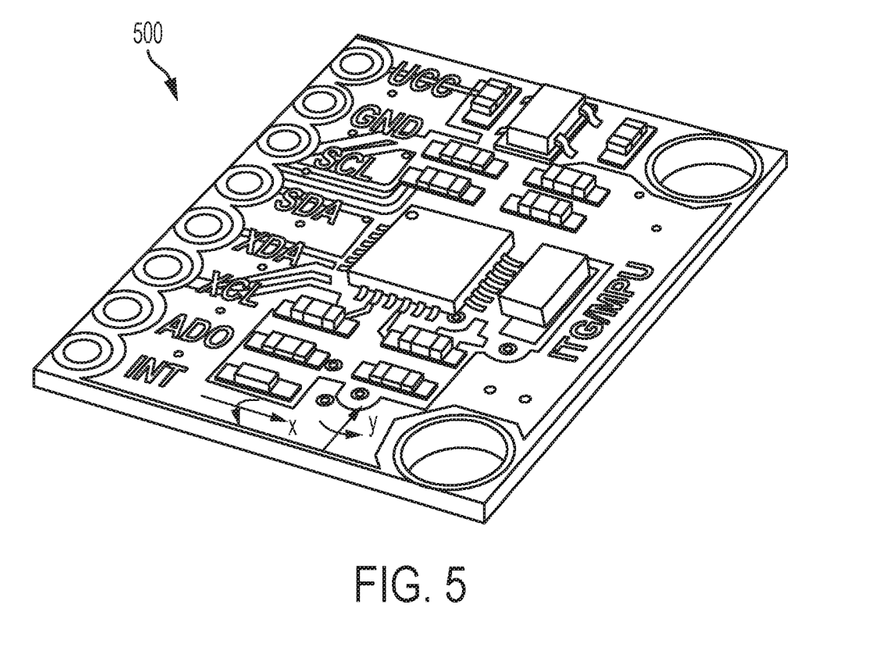
FIG. 5 illustrates a printed board with a gyroscope with supporting electronics in accordance with one or more embodiments of the present invention.

As described previously, the system, or device, can include two parts for independent control: micro-electronic machine (MEM) accelerometer 400 of different types such as that shown in FIG. 4 which follows the speed of the vehicle on horizontal segments of travel; and a MEM gyroscope circuitry system 500, such as that shown in FIG. 5, which controls speed fluctuations when a vehicle climbs up a hill or drives down a slope. One or more embodiments use a single, highly sensitive, tri-axis, accelerometer. For example, a 16-bit ST LIS2HH12 accelerometer and evaluation boards STEVAL MKI109V2 and STEVAL-MKI164V1 can be used to acquire data.

One or more embodiments of the present invention can be utilized in vehicles with automatic throttle and cruise control. Current cruise control and self-driving systems use wheel speed feedback to adjust engine throttle in an attempt to maintain a programmed speed. A problem with this is that the vehicle speed must first change before the throttle is increased. This means that fuel is wasted by attempting to bring the vehicle speed back into regulation. To correct the issue, one or more embodiments of the present invention modify the throttle before the vehicle's speed has changed, thus providing a feed-forward system. Embodiments described herein utilize an accelerometer to detect changes in vehicle angle, which correlates to changes in road angle (or road grade) as an input to a feed-forward system. Because feed-forward control systems do not use an error signal as an input, they are inherently stable.

Figure 6:
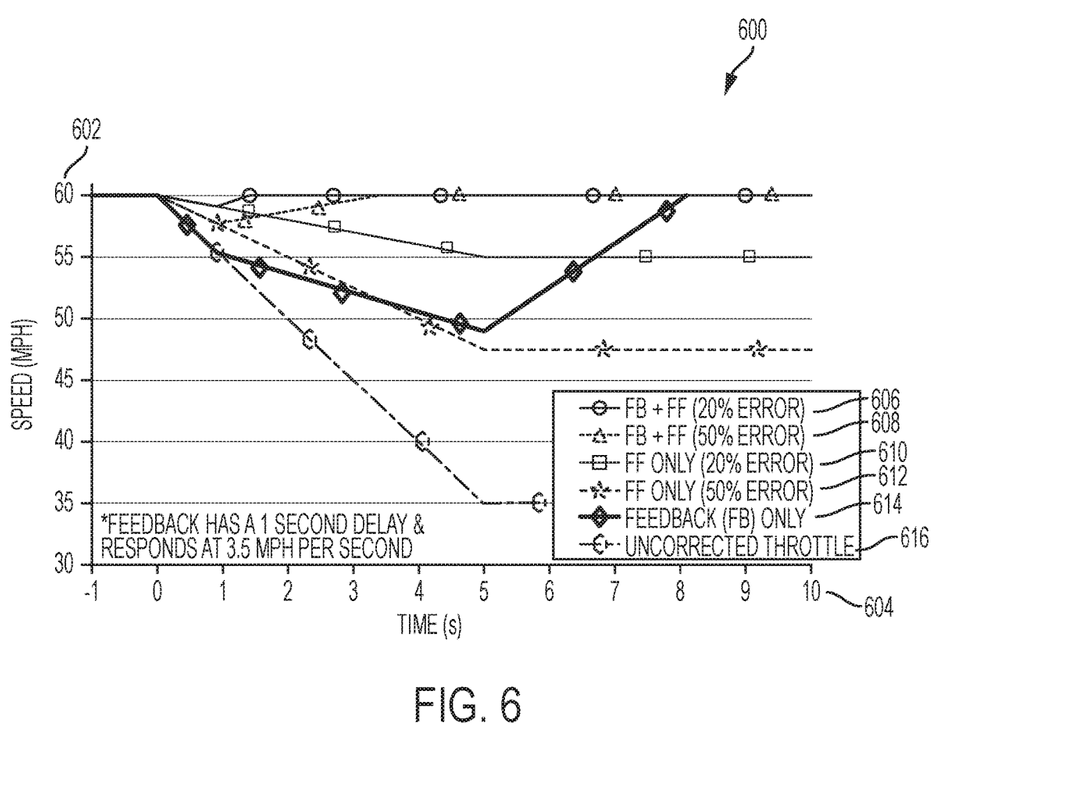
FIG. 6 illustrates how the addition of feed-forward assists a vehicle when climbing a hill in accordance with one or more embodiments of the present invention.

Turning now to FIG. 6, a chart 600 that illustrates how the addition of feed-forward assists a vehicle when climbing a hill is generally shown in accordance with one or more embodiments of the present invention. The vertical axis 602 of the chart 600 represents speed in miles-per-hour (MPH) and the horizontal axis 604 represents time in seconds. The example shown in FIG. 6 is an exaggerated example of how the addition of feed-forward aids a vehicle in maintaining regulation when climbing a hill, even when the feed-forward model is only 50% accurate. The examples shown in FIG. 6 include a vehicle climbing a hill with an uncorrected throttle (no change) 616, feedback only 614, feed-forward only with a 50% error 612, feed-forward only with a 20% error 610, feed-forward plus feedback with a 50% error 608, and feed-forward plus feedback with a 20% error 606. Additional fuel may be conserved when cruise control is operating if the vehicle manufacturer programs an intentional "droop" into the system when climbing a hill. This droop would allow the vehicle's speed to "droop" out of regulation by a few miles per hour when the vehicle is climbing a hill. This reduces peak acceleration and helps conserve fuel. Some cruise control systems already attempt to do this by using a small gain when the vehicle is close to its desired cruise speed. However, using measured road grade allows for better accuracy and response.

Contrary to contemporary controllers which may control the speed of the vehicle, one or more embodiments of the invention described herein control the vehicle acceleration. In accordance with one or more embodiments of the present invention, the precision of control on vehicle acceleration by the MEM based device is 0.2 cm$^2$/sec. In any vehicle, the vehicle computer is programmed to perform all the functionality starting from setting the cruise control speed to the speed correction to maintain the speed. In accordance with one or more embodiments of the present invention, the outputs from the device, which is the combination of the accelerometer and the gyroscope are fed to the car computer and used to program the vehicle to go with steady speed, i.e. with zero acceleration as a goal.

In accordance with one or more embodiments of the present invention, a different mode of speed control is utilized. A feed-forward technique uses a look-up table, such as that shown in Table 1, from the vehicle computer to correct the vehicle speed during cruise control, using desired vehicle speed and road grade (angle) as inputs. The lookup table can be programmed by the vehicle manufacturer with either calculated values or values determined experimentally. In accordance with one or more embodiments, when the driver sets the desired speed, the engine computer determines what the error is in the feed-forward calculation and corrects for it. In other words, the engine computer "pre-calculates" the wheel speed feedback error. It can do this by dividing the current throttle value by the calculated throttle value. In subsequent "cycles", the wheel speed feedback will add/subtract from this correction term. Columns 4 and 5 of Table 1 shows the speed at which the car will be travelling with a feed-forward technique which has a 50% error and 20% error respectively.

TABLE 1

Programmed corrections of the speed of car to minimize the accelerations

| Time | Uncorrected Throttle | Feedback Only | Feed-Forward Only (50% Error) | Feed-Forward Only (20% Error) | Feed-Forward (50% Error) + Feedback | Feed-Forward (20% Error) + Feedback |
|---|---|---|---|---|---|---|
| 0 s | 60 MPH | 60 MPH | 60 MPH | 60 MPH | 60 MPH | 60 MPH |
| 1 s | 55 MPH | 56 MPH | 58 MPH | 59 MPH | 59 MPH | 60 MPH |
| 5 s | 35 MPH | 44 MPH | 48 MPH | 55 MPH | 53 MPH | 60 MPH |
| 10 s | 35 MPH | 54 MPH | 48 MPH | 55 MPH | 58 MPH | 60 MPH |
| 15 s | 35 MPH | 60 MPH | 48 MPH | 55 MPH | 60 MPH | 60 MPH |
| 20 s | 35 MPH | 60 MPH | 48 MPH | 55 MPH | 60 MPH | 60 MPH |
| 25 s | 35 MPH | 60 MPH | 48 MPH | 55 MPH | 60 MPH | 60 MPH | t = 0 is when the vehicle first starts climing hill

One or more embodiments of the present invention take into account the fact that after a stop, say at a streetlight, the vehicle should accelerate.

One or more embodiments of the present invention include a new micro-machine technology-based system, which is much more accurate than current wheel speed feedback systems. One or more embodiments of the system do not require the redesign of any existing wheel speed feedback systems.

One or more embodiments of the present invention can be described in terms of three modes of operation. The two manual modes may either be user-selectable or fixed by the vehicle manufacturer: automatic throttle (cruise control); manual throttle, economy, and manual throttle, performance/comfort.

In accordance with one or more embodiments of the present invention, a measured road profile (uphill/downhill) is utilized. Some vehicles may already have knowledge of road profile through sensors for unrelated tasks, such as auto-leveling headlights or rollover protection.

Contemporary cruise control and self-driving systems use wheel speed feedback to adjust engine throttle in an attempt to maintain a programmed speed. A problem with this is that the vehicle speed must first change before the throttle is increased. This means that fuel is wasted by attempting to bring the vehicle speed back into regulation. Embodiments of the present invention correct his issue by adjusting the throttle before the vehicle speed changes.

In accordance with one or more embodiments, an accelerometer is utilized to detect changes in vehicle angle, which correlates to changes in road angle (or road grade) as an input to a feed-forward system. Because feed-forward control systems do not use an error signal as an input, they are inherently stable. In order to implement a feed-forward control, a vehicle manufacturer can create a lookup table or mathematical equation that correlates changes in road grade to an approximate change in throttle value.

Many drivers, particularly those inclined to purchase sportier vehicles, may find a reduction in gas pedal response when climbing a hill to be intrusive and undesirable. However, even these drivers can still benefit from the feed-forward system described herein. When operated in performance/comfort mode, the engine control will automatically increase throttle when climbing a hill and slightly decrease throttle when cresting the hill. Such operation has at least two benefits. By applying extra throttle while climbing a hill, it reduces the driver's urge to accelerate hard to catch back up to speed. This saves fuel and reduces emissions. Like economy mode, free-fall detection may be used to monitor for potholes and mute changes in gas pedal position. However, unlike economy mode, the gas pedal response remains unchanged when traversing a hill. Another way that this mode is beneficial is that it creates a perception that the engine has better torque than it may have in reality. Many drivers judge a vehicle's torque by how well it maintains speed when climbing a hill. If the engine control automatically increases the throttle without driver input, the engine will appear to have more torque, increasing perceived vehicle quality and performance to the driver. Such control may work in a desired manner when used with a continuously variable transmission (CVT) so that no obvious change in gear ratio is detected by the driver Technical effects and benefits can include helping to economize the fuel consumption of a vehicle, thus making a vehicle operate in a cleaner mode as far as impact on environment is concerned.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A system comprising:
   an accelerometer configured to measure acceleration of a vehicle;
   a gyroscope configured to measure orientation of the vehicle, the orientation including a road profile;
   a memory having computer readable instructions; and
   a processor for executing the computer readable instructions, the computer readable instructions including:
      performing at intervals:
         receiving acceleration data from the accelerometer;
         receiving orientation data including road profile data from the gyroscope;
         combining the acceleration data and the orientation data to generate speed fluctuation and slope data for the vehicle; and
         transmitting the fluctuation and slope data to a controller of the vehicle, wherein the controller modulates a driver input to an engine throttle of the vehicle based at least in part on the speed fluctuation and slope data, and
   wherein the controller of the vehicle modulates the engine throttle of the vehicle by reducing a number of times that the throttle cycles within a time period.

2. The system of claim 1, wherein the accelerometer is a tri-axis accelerometer and additional orientation data is received from the accelerometer.

3. The system of claim 1, wherein the fluctuation and slope data are adjusted based on detecting one or more of potholes, up hills, down hills on a roadway being traveled by the vehicle.

4. The system of claim 1, wherein the fluctuation and slope data are adjusted based on detecting a fast acceleration of the vehicle.

5. The system of claim 1, wherein the vehicle is an automobile.

6. The system of claim 1, wherein the controller increases the driver input to the throttle in response to detecting climbing a hill.

7. The system of claim 6, wherein the controller decreases the driver input to the throttle in response to detecting cresting a hill.

8. A method comprising:
   performing at intervals, by a processor located on a vehicle:

receiving acceleration data from an accelerometer that is configured to measure acceleration of the vehicle;

receiving orientation data from a gyroscope that is configured to measure orientation of the vehicle;

combining the acceleration data and the orientation data to generate speed fluctuation and slope data for the vehicle; and transmitting the fluctuation and slope data to a controller of the vehicle, wherein the controller modulates a driver input to an engine throttle of the vehicle based at least in part on the speed fluctuation and slope data, and wherein the controller of the vehicle modulates the engine throttle of the vehicle by reducing a number of time that the throttle cycles within a time period.

9. The method of claim 8, wherein the accelerometer is a tri-axis accelerometer and additional orientation data is received from the accelerometer.

10. The method of claim 8, wherein the fluctuation and slope data are adjusted based on detecting one or more of potholes, up hills, down hills on a roadway being traveled by the vehicle.

11. The method of claim 8, wherein the fluctuation and slope data are adjusted based on detecting a fast acceleration of the vehicle.

12. The method of claim 8, wherein the vehicle is an automobile.

13. The method of claim 8, wherein the controller increases the driver input to the throttle in response to detecting climbing of a hill.

14. The method of claim 13, wherein the controller decreases the driver input to the throttle in response to detecting cresting of a hill.

15. A computer program product comprising a computer readable storage medium having program instructions embodied therewith, the program instructions executable by processing circuitry to cause the processing circuitry to perform:

performing at intervals:

receiving acceleration data from an accelerometer that is configured to measure acceleration of the vehicle;

receiving orientation data from a gyroscope that is configured to measure orientation of the vehicle;

combining the acceleration data and the orientation data to generate speed fluctuation and slope data for the vehicle; and transmitting the fluctuation and slope data to a controller of the vehicle, wherein the controller modulates a driver input to an engine throttle of the vehicle based at least in part on the speed fluctuation and slope data, and wherein the controller of the vehicle modulates the engine throttle of the vehicle by reducing a number of times that the throttle cycles within a time period.

16. The computer program product of claim 15, wherein the accelerometer is a tri-axis accelerometer and additional orientation data is received from the accelerometer.

17. The computer program product of claim 15, wherein the fluctuation and slope data are adjusted based on detecting one or more of potholes, up hills, down hills on a roadway.

* * * * *